United States Patent [19]

Koechner

[11] Patent Number: 4,917,481
[45] Date of Patent: Apr. 17, 1990

[54] HIGH INTENSITY LASER RADIATION PROTECTION

[75] Inventor: Walter Koechner, Great Falls, Va.
[73] Assignee: Fibertek, Inc., Herndon, Va.
[21] Appl. No.: 202,819
[22] Filed: Jun. 6, 1988
[51] Int. Cl.[4] ............................................. G02F 1/01
[52] U.S. Cl. ................................................... 350/363
[58] Field of Search ............................. 350/354, 363
[56] References Cited

U.S. PATENT DOCUMENTS

| | | | |
|---|---|---|---|
| 3,301,624 | 1/1967 | Morriss, Jr. ..................... | 350/363 X |
| 3,409,909 | 11/1968 | Scott et al. ..................... | 350/363 X |
| 3,734,592 | 5/1973 | Sztankay et al. ............... | 350/363 X |
| 4,272,164 | 6/1981 | Trussell, Jr. ................... | 350/363 X |
| 4,562,568 | 12/1985 | Hazel et al. .................... | 350/174 X |
| 4,719,342 | 1/1988 | Cohn et al. ..................... | 350/363 X |

Primary Examiner—Eugene R. LaRoche
Assistant Examiner—Nathan W. McCutcheon
Attorney, Agent, or Firm—Herman J. Hohauser

[57] ABSTRACT

A high intensity laser radiation protection system is characterized by the use of a thin film reflector structure which is operable to terminate transmission of optical signals to an optical sensor in response to high intensity laser radiation. The thin film reflector includes a glass substrate having a thin layer of radiation absorption material applied thereto with a thin layer of reflective metal film applied to the absorption layer. The absorption layer has a low melting and vaporization temperature, and the layer of metal film has a thickness affording passage of a limited amount of laser radiation to the absorption layer. When laser radiation having a predetermined intensity is received by the absorption layer, the absorption layer rapidly melts and destroys the metal film layer to terminate optical transmission to the optical sensor, thereby preventing damage to the sensor from the laser radiation.

11 Claims, 3 Drawing Sheets

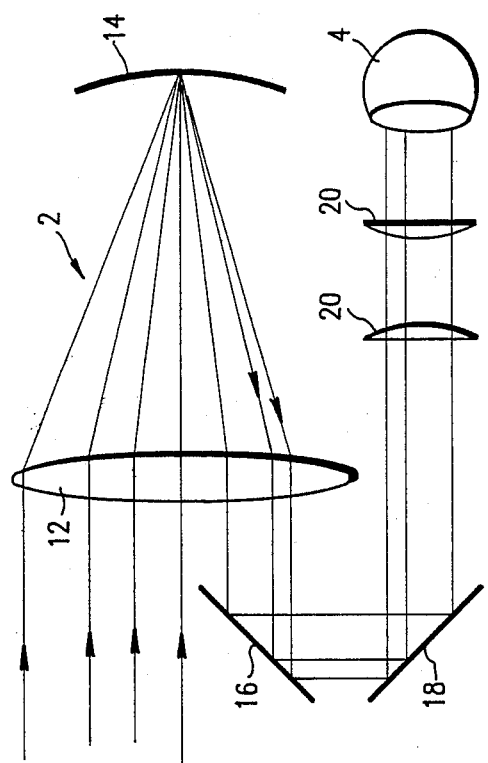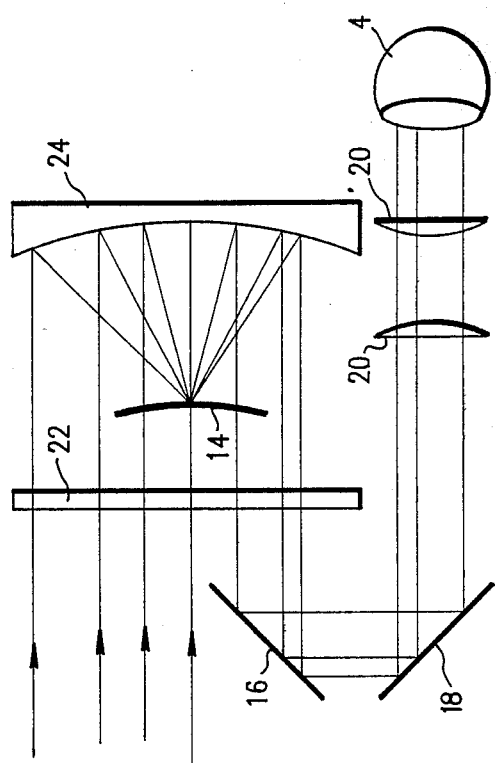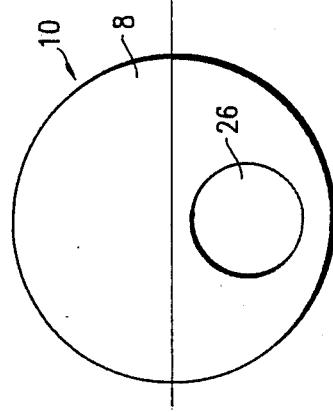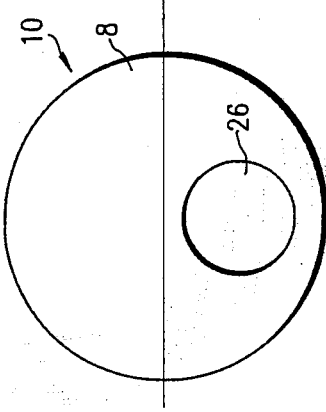
FIG. 1
FIG. 2

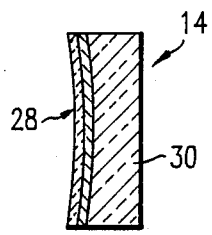
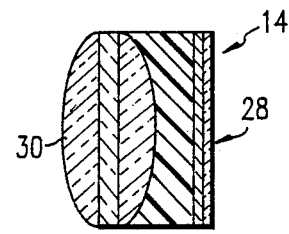
*FIG. 3*     *FIG. 4*
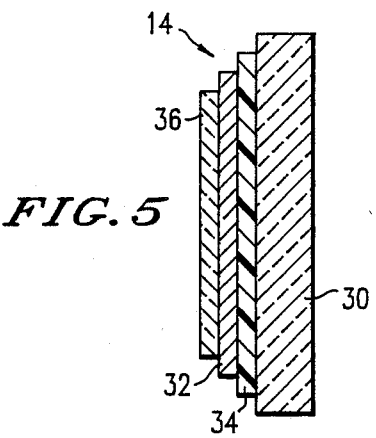
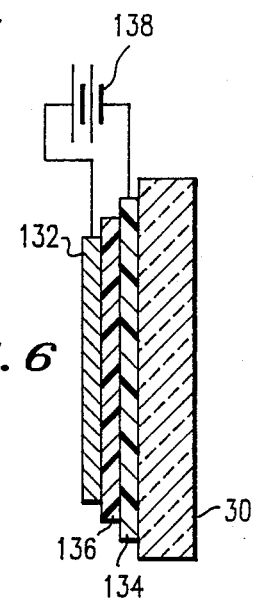
*FIG. 5*     *FIG. 6*
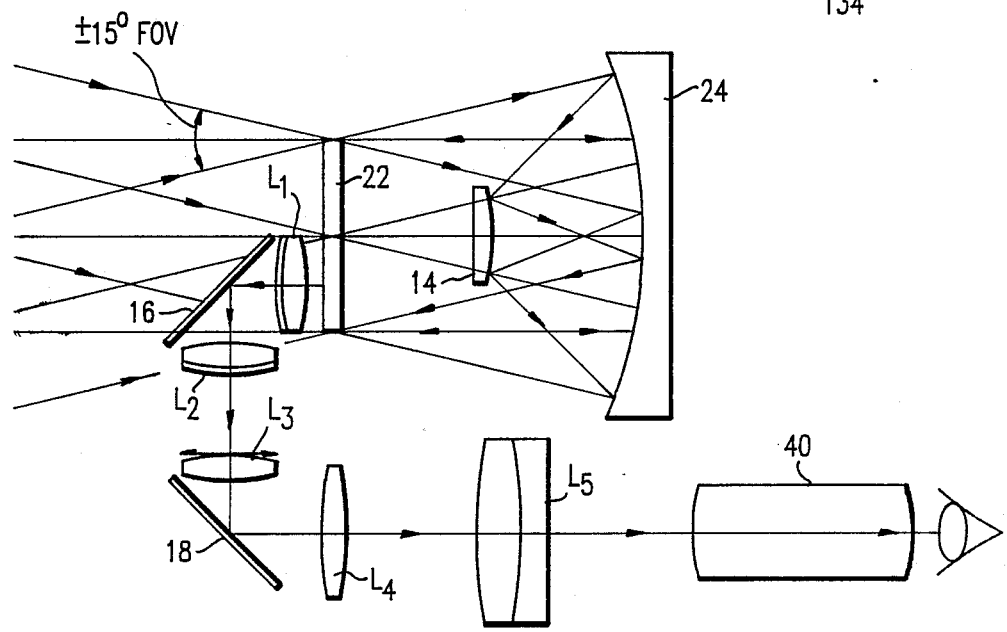
*FIG. 7*

4,917,481

HIGH INTENSITY LASER RADIATION PROTECTION

BACKGROUND OF THE INVENTION

It is often necessary to protect an optical sensor such as the human eye, a television, or an image intensifier from the harmful and damaging effects of high power radiation over a broad wavelength. The present invention was developed to provide such protection.

BRIEF DESCRIPTION OF THE PRIOR ART

Radiation protective shields are well-known in the patented prior art as evidenced by the Scott U.S. Pat. No. 3,756,692 and McKoy U.S. Pat. No. 4,622,174. The Scott patent discloses a welder's face shield utilizing photochromic materials which change from transparent states to optically dense states to provide decreasing radiation transmission with increasing radiation impingement. The McKoy et al patent discloses a transparent protective laser shield for absorbing more than one pre-determined narrow band radiation of a laser beam while transmitting radiation in a broader band. Also known in the art are laser protective goggles which are currently manufactured by a plurality of companies.

A major drawback of the current laser protection devices is that they provide protection only for a fixed or predetermined wavelength. For example, laser goggles typically employ a combination of filters and dielectric coatings which selectively reflect or absorb specific wavelengths. However, if the laser wavelength is not known, or if tunable lasers are employed with the intent of blinding people, conventional laser goggles are useless since they can only be designed to absorb or reflect certain fixed wavelengths.

The present invention was developed in order to overcome these and other drawbacks of conventional laser protection systems by providing a protection system which is intensity rather than wavelength dependent.

SUMMARY OF THE INVENTION

The laser radiation protection system according t the invention comprises a unique optical assembly including as a nonlinear element a reflective thin film sandwich structure which acts as an optical switch to prevent high intensity laser radiation of any wavelength from being transmitted to a sensor, such as a human eye, being protected. If direct radiation from a laser beam enters the field of view of the protective system, a dense and absorbing plasma is created in a tiny localized spot. At that spot, reflectivity is reduced from one to essentially zero owing to vaporization of the reflective film. These transmission limiting effects take place during the leading edge of a Q-switched laser pulse once a predetermined intensity threshold has been exceeded. By providing different component materials in the reflective thin film structure, protection in all spectral regions from the visible to mid-infrared to far-infrared is provided.

According to a primary object of the invention, the laser protection optical system receives an optical signal and includes a reflection device for focusing the signal. An optical switch, which comprises a nonlinear reflective thin film structure, receives the focused optical signal. The switch is operable to normally transmit the optical signal, but is destroyed upon receipt of laser radiation having a predetermined intensity to terminate optical transmission. A reflector assembly is provided to reflect the output from the optical switch to the sensor being protected.

According to a more specific object of the invention, the optical switch includes a glass substrate, a layer of radiation absorption material having a low melting and vaporization temperature mounted on the substrate, and a layer of reflective film mounted on the layer of absorption material. The layer of reflective metal film has a thickness affording passage of a limited amount of laser radiation directed thereon to the layer of radiation absorbing material resulting in rapid melting of the layer of radiation absorption material and destruction of the metal film layer to terminate optical transmission through the switch to the sensor.

It is a further object of the invention to incorporate the laser radiation protection system into a pair of goggles for protecting the eyes of the wearer from damage from laser radiation.

BRIEF DESCRIPTION OF THE FIGURES

Other objects and advantages of the present invention will become apparent from a study of the following specification when viewed in the light of the accompanying drawing, in which:

FIGS. 1 and 2 are optical schematic diagrams of first and second embodiments of the optical system affording protection from laser radiation;

FIGS. 3-6 are side plan views of alternate embodiments of the reflective thin film sandwich structure defining the optical switch according to the invention;

FIG. 7 is an optical schematic view of a relay telescope based upon the embodiment of the optical system of FIG. 2.

DETAILED DESCRIPTION

Figure 9:
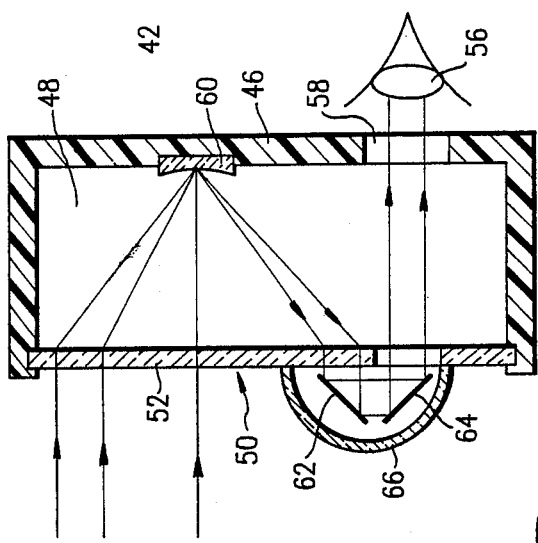
FIGS. 8, 9, and 10 are front plan, side sectional, and perspective views, respectively, of a pair of laser protective goggles according to the invention.

Referring first to FIG. 1, the high intensity laser radiation protection optical system according to the invention will be described. The system 2 is designed to provide protection to an optical sensor 4 which might for example be the human eye, an image intensifier, or other sensor likely to be damaged by exposure to high intensity laser radiation. An optical signal 6 passes through the entrance aperture 8 of a shield 10 and is focused by an objective lens 12 onto a low damage threshold reflective film structure 14. The film reflects the optical signal back through the lens 12, with a fraction of the reflected light being intercepted by a reflective mirror 16 and reflected by the mirror 16 and a second mirror 18 through the lenses 20 of an eyepiece to the eye 4.

As will be developed in greater detail below, when the optical signal 6 contains or comprises a laser beam of a predetermined intensity, the reflective film 14 operates as an optical switch to terminate further optical transmission to the eye.

In the embodiment of FIG. 2, the objective lens is replaced by a corrector plate 22 which directs the optical signal 6 onto a concave mirror 24 such as a Schmidt device. The concave mirror focuses the optical signal onto the reflective film 14 which reflects the signal back to the lens 24. A portion of the reflected signal is intercepted by the mirror 16 for delivery to the eye 4 via the mirror 18 and eyepiece lenses 20.

In each of the embodiments of FIGS. 1 and 2, the mirrors 16, 18 may be replaced with reflective prisms. The device of each embodiment is essentially co-linear except for a small off-set between the axis of the entrance and exit beam, similar to that in a binocular, with the exit beam passing through a viewing channel 26. Duplicating the design for the other eye leads to the configuration of a pair of goggles.

Although the concept of employing destructive mirrors for optical power limiters is not new, what makes this approach unique in the optical system of the present invention are (1) the optical system design leads to a partitioning of the energy incident on the nonlinear reflective element and incident on the sensor or eye; and (2) the design of a low threshold, fast acting thin film composite optical switch.

Referring once again to FIG. 1, the energy collected by the objective lens and focused onto the composite reflective film is larger than the energy reaching the eye by the ratio of the areas of the entrance aperture 8 and viewing channel 26. The area of the viewing channel 26 corresponds with the area of the pupil of the eye being protected.

The fact that the total energy reaching the reflective film and the energy reaching the eye can be separated is very important, because it allows great design flexibility in selecting the appropriate breakdown characteristics of the thin film structure. In other words, the energy density at the film can be made very high, a condition conducive to fast breakdown conditions, without exceeding the threshold limits of the human eye or other appropriate sensor. At the same time, the basic performance characteristics of the observer is unchanged.

Many years of studies of the damage mechanisms of optical thin films carried out by the laser community, in conjunction with the experience gained as a result of thin film micromachining extensively employed in the semi-conductor industry and ablative techniques used in high density optical storage media, have provided detailed insight into the physics of laser induced breakdown and subsequent material removal of optical surfaces.

The insight gained from these activities leads to the following general design principle for a fast acting, low threshold optical switch. As shown in FIG. 3, a thin film structure 28 can be coated onto a concave glass substrate 30. Alternatively, the thin film structure 28 can be coated onto the back of a field lens as shown in FIG. 4. The thin film structure preferably comprises three layers, the middle layer comprising a thin (1 μm or less) metal film which provides the reflectivity of the device. The layer on top is a transparent polymer film (a few thousand Å) containing either submicron inclusions or a small amount of absorbing dye. The third layer is a highly absorbing polymer film. The composite film is highly reflective in the region of interest. At the threshold damage limit, the polymer layer on top of the metal film will melt, vaporize and form a dense cloud of a highly opaque plasma due to its carbon content. At the same time initiated by the polymer, the thin metal film will breakdown and evaporate. The evaporation process will be accelerated by the absorbing polymer film behind the metal film. The reflective metal film has to be deposited thin enough, such that there is a finite transmission through it (for example 5 to 10%). The radiation leaking through the metal film will be absorbed by the low melting point polymer film which will evaporate and remove the reflective layer on top by microexplosion as is known for the case of metal films on ceramic substrates.

In the case of continuous wave laser illumination, the polymer films on top of the metal film will bubble, and the absorbing polymer behind the metal thin film will melt and therefore destroy the area of the metal film on top. The overall effect is a loss in optical transmission, thereby resulting in effective eye protection.

State of the art techniques such as chemical vapor deposition (CVD) and sol-gel methods make it possible to create thin films with unique properties. For example, films can be fabricated containing well controlled voids on the order of a few Angstroms (zeolites) into which organic and inorganic materials can be embedded. Thus by embedding inclusions and creating plasma formation points, thin films made of polymer, glasses or ceramics can be fabricated with very specific optical nonlinear properties.

The presence of plasma and vaporization centers combined with the low melting temperature and low damage threshold of these thin polymer films make it possible to terminate transmission on the order of a few nanoseconds or less for the intended device.

Referring now to FIG. 5, a preferred embodiment if a thin film reflective structure 14 will be described. The structure includes a glass substrate 30 upon which three film layers are mounted. A thin layer of aluminum film (0.5–1.0 μm) 32 is sandwiched between an inner layer 34 of absorbing polymer film and an outer layer 36 of transparent polymer film. Alternatively, the metal layer 32 may be sandwiched between an inner layer of tellurium and an outer layer of zeolite. In either case, the metal film provides the reflectivity of the switch, the metal film layer 32 having a thickness which allows for some percentage transmission to occur into the underlying layer 34. The underlying layer completely absorbs the radiation leaking through the metal film. Since this layer has an extremely low melting and vaporization temperature, it will lead to a very fast localized damage mechanism. The outer layer 36 provides well controlled inclusions for surface breakdown and plasma formation, and increases the optical density of the plasma.

An interesting variation to the structure of FIG. 5 is shown in FIG. 6. In this variation, the surface breakdown mechanism is assisted by a high electric field strength. The reflective structure is comprised of a metal film 132 for optical reflection, with some leakage into an absorbing dielectric film 136 and an absorbing tellurium film 134. The design is essentially a capacitor. The applied voltage 138 stresses the dielectric just below the breakdown of the polymer film. Any temperature rise or electron formation due to an electron avalanche caused by an optical pulse exceeding a certain threshold will cause breakdown at the beam impact area. A totally absorbing plasma will be formed and a crater will result removing the reflective surface at this point.

In order for the invention to operate over a reasonable field of view, the film plane to a first order must have spherical curvature as shown in FIGS. 1–3 with a center defined by the intersection of the second principal plane as with the optical axis of the objective lens. A more detailed ray trace analysis reveals that for better resolution over a 40° field of view, an aspheric optical element (field lens) in front of the film should be added as shown in FIG. 4. There is a large degree of optical design flexibility available for the realization of the proposed concept. The objective lens can be a doublet or triplet, or an aspheric design. A spherical or aspherical field lens attached to the film can be employed, the curvature of the film optimized, and an appropriately matched eyepiece can be added to the design. The final design will depend on such criteria as field of view, resolution, number of elements, cost and complexity.

Instead of a refractive design, the optical system according to the invention can be configured as shown in FIG. 4 as a Schmidt reflector with a specially designed corrector plate 22 as shown in FIG. 2. In the apparatus of FIG. 4, which represents a relay telescope with Schmidt objective, light from the corrector plate passes to the concave mirror 24 for focusing on the reflective film 14 and reflection back to the mirror 24. A portion of the signal passes through objective lenses $L_1$ and $L_2$ via mirror 16, and through field lens $L_3$ to mirror 18 for delivery to relay lenses $L_4$ and $L_5$. From the lens $L_5$, the optical signal enters an eyepiece 40.

Figure 10:
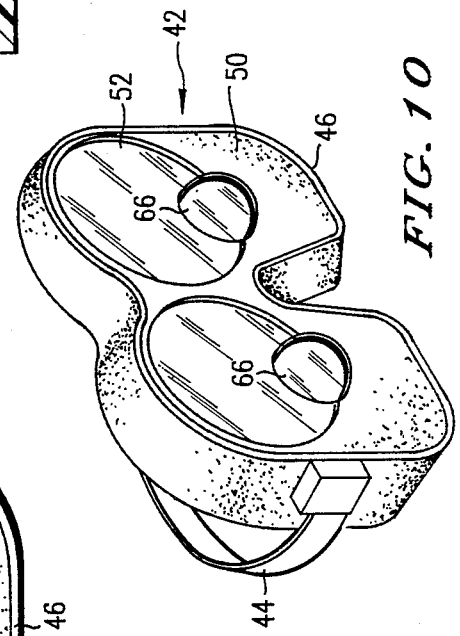
Figure 8:
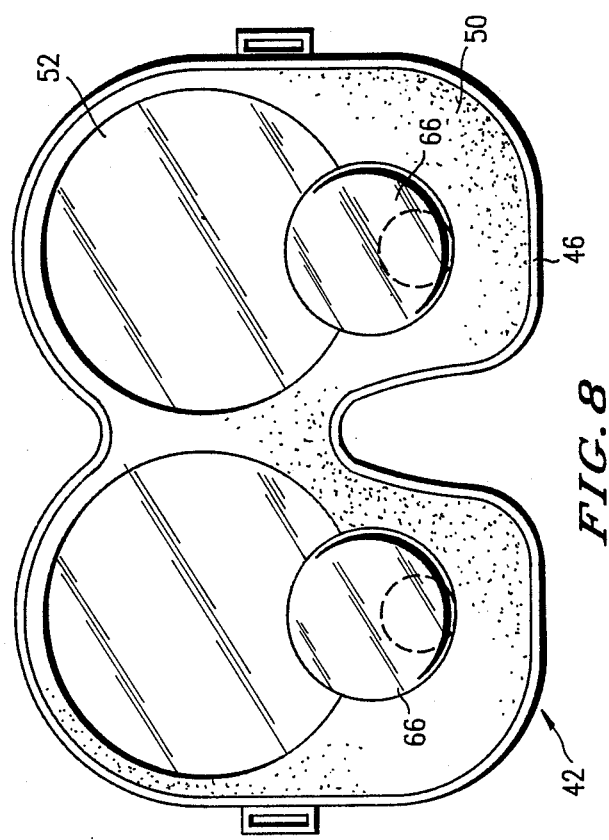

FIGS. 8-10 illustrate a pair of laser protection goggles 42 according to the invention. The goggles may be attached to a helmet and quickly flipped down if a laser threat is perceived. Alternatively, a strap 44 may be provided for wearing the goggles for a longer duration.

The goggles include a synthetic plastic frame 46 defining a chamber 48 open at one end. A light weight Fresnel lens 50 having a generally planar configuration is connected with the frame to close the open end of the chamber. The lens 50 includes a transmission portion 52 for transmitting optical signals to the interior of the chamber and an opening 54 in the lower portion thereof opposite the eye 56 of the wearer of the goggles. The frame 46 also contains an opening 58 opposite the eye of the wearer and aligned with the opening 54 in the lens 52. A thin film reflective optical switch 60 is connected with the frame 46 within the chamber 48. The Fresnel lens 50 focuses the optical signals onto the optical switch 60 which reflects the signals back through a portion of the lens 50 to first and second mirrors 62, 64 which redirect the optical signals through the aligned openings 54, 58 in the lens and frame, respectively, to the wearer's eye. A shielding device 66 is connected with the outer surface of the lens for shielding the mirrors and the lens opening 54 from external optical signals and from direct laser radiation. The optical switch 60 has the structure of the devices shown in FIGS. 3-6 and operates in the same manner as the reflective film device 14 of FIGS. 1, 2, and 7.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A pair of goggles for protecting the eyes of the wearer from laser radiation while affording transmission of other optical signals to the wearer's eyes, comprising
    (a) a frame defining a chamber open at one end;
    (b) a generally planar lens connected with said frame for closing the open end of said chamber, said lens including means for transmitting optical signals to the interior of said chamber and containing at least one opening;
    (c) optical switch means connected with said frame within said chamber, said switch means normally transmitting said optical signal as an output signal through said lens means, said switch means being operable upon receipt of laser radiation having a predetermined intensity to terminate transmission of the optical signals; and
    (d) reflector means arranged adjacent said lens opening for reflecting said optical switch output signal through said lens opening to the eyes of the wearer, whereby the wearer's eyes receive only output optical signals from said optical switch corresponding with optical signals transmitted into said chamber by said lens means, and further whereby upon receipt of laser radiation above a predetermined intensity threshold, said optical switch means terminates optical transmission to protect the wearer's eyes from the laser radiation.

2. A pair of goggles as defined in claim 1, and further comprising shielding means connected with the outer surface of said lens for shielding said reflector means and said lens opening from external optical signals and radiation.

3. A pair of goggles as defined in claim 2, wherein said optical switch means is nonlinear and comprises
    (1) a substrate;
    (2) a layer of radiation absorption material having a low melting and vaporization temperature mounted on said substrate; and
    (3) a layer of reflective metal film mounted on said layer of absorption material, said layer of reflective metal film having a thickness affording passage of a limited amount of laser radiation directed thereon to said layer of radiation absorbing material, thereby resulting in rapid melting of said layer of radiation absorption material and destruction of said metal film layer to terminate optical transmission through said switch to the sensor.

4. A pair of goggles as defined in claim 3, wherein said layer of radiation absorption material comprises a dark polymer material.

5. A pair of goggles as defined in claim 4, wherein said layer of metal film comprises aluminum and further comprising a layer of transparent polymer film mounted on said aluminum layer.

6. A pair of goggles as defined in claim 3, wherein said layer of radiation absorption material comprises tellurium.

7. A pair of goggles as defined in claim 6, wherein said layer of metal film comprises aluminum, and further comprising a layer of zeolite mounted on said aluminum layer.

8. A pair of goggles as defined in claim 6, further comprising
    (1) a layer of dielectric film arranged between said tellurium and metal film layers; and
    (2) means for generating a voltage across said tellurium and metal film layers for assisting in breakdown of said layer of dielectric film.

9. A low threshold nonlinear thin film optical switch for protecting a sensor from destruction by a laser beam, comprising
    (a) a substrate;
    (b) a layer of radiation absorption material having a low melting and vaporization temperature mounted on said substrate; and
    (c) a layer of reflective metal film mounted on said layer of absorption material, said layer of reflective metal film having a thickness affording passage of a limited amount of laser radiation directed thereon to said layer of radiation absorption material, thereby resulting in rapid melting of said layer of radiation absorption material and destruction of said metal film layer to terminate optical transmission through the switch to a sensor when the laser radiation has a predetermined intensity, whereby when an optical signal is received by the switch, the signal is reflected by the metal film layer of the switch to the sensor being protected, and when laser radiation having a predetermined intensity is received by the switch, said metal film layer is destroyed to prevent the laser radiation from being transmitted to the sensor, wherein said layer of radiation absorption material comprises tellurium and wherein said layer of metal film comprises aluminum, and further comprising a layer of zeolite mounted on said aluminum layer.

10. A low threshold nonlinear thin film optical switch for protecting a sensor from destruction by a laser beam, comprising
 (a) a substrate;
 (b) a layer of radiation absorption material having a low melting and vaporization temperature mounted on said substrate; and
 (c) a layer of reflective metal film mounted on said layer of absorption material, said layer of reflective metal film having a thickness affording passage of a limited amount of laser radiation directed thereon to said layer of radiation absorption material, thereby resulting in rapid melting of said layer of radiation absorption material and destruction of said metal film layer to terminate optical transmission through the switch to a sensor when the laser radiation has a predetermined intensity, whereby when an optical signal is received by the switch, the signal is reflected by the metal film layer of the switch to the sensor being protected, and when the laser radiation having a predetermined intensity is received by the switch, said metal film layer is destroyed to prevent the laser radiation from being transmitted to the sensor
wherein said layer of radiation absorption material comprises tellurium and said switch further comprises
 (1) A layer of dielectric film arranged between said tellurium and metal film layers; and
 (2) means for generating a voltage across said tellurium and metal film layers for assisting in breakdown of said layer of dielectric film.

11. An optical system for protecting a sensor from destruction by a laser beam, comprising
 (a) means for receiving an optical signal;
 (b) lens means for focusing said optical signal;
 (c) optical switch means receiving said focused optical signal, said switch means normally transmitting said optical signal as an output signal and being destroyed upon receipt of laser radiation having a predetermined intensity to terminate optical transmission; and
 (d) reflector means for reflecting said output signal toward the sensor, whereby the sensor is protected from damage resulting from laster radiation owing to the operation of said switch means in response to the laser radiation above the predetermined intensity threshold wherein said lens means comprises a concave mirror and said optical switch means comprises a convex threshold reflective film structure.

* * * * *